United States Patent
McClean et al.

(10) Patent No.: US 8,792,091 B2
(45) Date of Patent: Jul. 29, 2014

(54) EMBEDDED OPTICAL TIME DOMAIN REFLECTOMETER FOR OPTICALLY AMPLIFIED LINKS

(75) Inventors: Ian McClean, Brixham (GB); Manish Sharma, Morgan Hill, CA (US)

(73) Assignee: II-VI Incorporated, Saxonburg, PA (US)

(*) Notice: Subject to any disclaimer, the term of this patent is extended or adjusted under 35 U.S.C. 154(b) by 53 days.

(21) Appl. No.: 13/584,531

(22) Filed: Aug. 13, 2012

(65) Prior Publication Data

US 2013/0038865 A1 Feb. 14, 2013

Related U.S. Application Data

(60) Provisional application No. 61/523,248, filed on Aug. 12, 2011.

(51) Int. Cl.
- *G01N 21/00* (2006.01)
- *G01M 11/00* (2006.01)
- *H04B 10/071* (2013.01)

(52) U.S. Cl.
CPC ......... *H04B 10/071* (2013.01); *G01M 11/3145* (2013.01); *G01M 11/3154* (2013.01)
USPC ...................................... 356/73.1

(58) Field of Classification Search
USPC ............ 356/73.1; 359/334; 385/140; 398/13, 398/17, 31
See application file for complete search history.

(56) References Cited

U.S. PATENT DOCUMENTS

| | | | |
|---|---|---|---|
| 5,077,729 A * | 12/1991 | Wong | 398/31 |
| 6,028,684 A | 2/2000 | Kidorf | |
| 6,178,025 B1 * | 1/2001 | Hardcastle et al. | 398/17 |
| 6,850,360 B1 * | 2/2005 | Chen et al. | 359/334 |
| 7,561,798 B2 | 7/2009 | Kokkinos | |
| 2004/0037555 A1 | 2/2004 | Evangelides, Jr. | |
| 2007/0031105 A1 * | 2/2007 | Walter et al. | 385/140 |
| 2010/0150547 A1 * | 6/2010 | Xia et al. | 398/13 |

OTHER PUBLICATIONS

PCT/US2012/050625 International Search Report (Oct. 26, 2012).

* cited by examiner

*Primary Examiner* — Tarifur Chowdhury
*Assistant Examiner* — Jamil Ahmed
(74) *Attorney, Agent, or Firm* — Fenwick & West LLP (57) ABSTRACT

Fiber-optic communications systems are provided for optical communications networks. Fiber-optic communications links may be provided that use spans of transmission fiber to carry optical data signals on wavelength-division-multiplexing channels at different wavelengths between nodes. An apparatus and method are disclosed to use one optical light source per node to perform OTDR and LCV to satisfy safety concerns and accelerate the verification of the integrity of optical fiber links, before the application of high Raman laser powered light sources to a fiber link. A system using only one receiver per node is also disclosed.

11 Claims, 5 Drawing Sheets

EMBEDDED OPTICAL TIME DOMAIN REFLECTOMETER FOR OPTICALLY AMPLIFIED LINKS

CROSS-REFERENCE TO RELATED APPLICATIONS

This application claims benefit of U.S. provisional patent application Ser. No. 61/523,248, filed Aug. 12, 2011, which is herein incorporated by reference.

BACKGROUND OF THE INVENTION

1. Field of the Invention

Embodiments of the present invention generally relate to an embedded optical time domain reflectometer and link continuity verification for optically amplified fiber links.

2. Description of the Related Art

Prior to optical amplification, a light signal diminished as it was transmitted through a fiber-optic transmission line. Fiber-optic transmission lines were set up to go 80 to 100 km and then convert the laser light back into an electrical signal, to be electrically amplified, then converted back to an optical signal and then sent further along the transmission line. When erbium-doped optical amplifiers were introduced, the light signal could go much further, 2 to 3000 km, without having to go through this complex, component-intensive, and therefore undesirable optical-electronic-optical conversion.

Optical amplifiers, since having been introduced, are not very expensive comparatively, are quite small, and work well, so they have been used almost exclusively in optical transmission systems since the mid-80s. However, the one disadvantage of an erbium-doped fiber amplifier approach is that the best amplifier devices cause the noise to double through the device. In less ideal, typical, amplification devices, the noise (signal) through the amplifier can be nearly quadrupled. There is a point when there is too much noise in the amplifier, which limits the maximum distance that light signals from erbium-doped fiber amplifiers can travel through glass transmission fibers, Optical amplifiers have progressed enough in recent years so that they can be used for signal data rates of 10 Gb per second-40 Gb, and even up to 100 Gb per second. Use of erbium-doped fiber amplifiers continues, but when operating at the 100 Gb per second level, every pulse is smaller and less energetic. Each pulse sent a given rate has a certain matched/ proportional energy. 100 Gb pulse rates have individual pulses that are 10 times smaller than the pulses of a 10 Gb pulse rate, so a lot less energy is put into the optical signal during signal transmission.

While clever schemes are used to get more light, basic physics dictates that there will always be less and less light energy and numbers of photons in the light signal as the pulse rate increases. As noise becomes a larger portion of the signal, the signal available for data transmission gets weaker. Performing tests in such systems with high signal rates becomes more difficult, so there has been the need to change the way in which amplifiers are used within telecommunications.

In the late 90s, a technique to improve amplification by putting a lot of laser light into the transmission fiber emerged. In that technique, rather than having the signal go along a fiber and lose power, the surplus energy in the laser light was passed to the vibrational states of the medium, the glass, to allow amplification of all-optical wavelengths. The resonantly stimulated laser light substantially maintained the power of the pulse that it encountered and provided assurance that the signal pulses did not lose as much power as similarly unstimulated pulses. This allowed data signals to go further without amplification. This technique uses a Raman amplifier, which uses Raman scattering as its light and energy producing physical process. OTDR using Raman pumps is disclosed in U.S. Pat. No. 6,850,360, which is hereby incorporated by reference herein.

The problem with a Raman amplifier is that it needs a very high power laser, which means that it is potentially very unsafe. Transmission line owners and operators do not like having a high-powered laser whose light cannot be seen by the human eye, such that when there is an open connector or a broken connector, the emitted light energy could blind somebody quite easily. The safety level standard for operation of laser apparatus and devices is defined in Standard IEC60825, which specifies the specific operational measure and safety identifier as well. The International Tele-communication Union-Telecommunication Standardization Sector (ITU-T) constitutes Standard G.664 for laser safety in communication systems. According to the Standard G.664, an optical communication apparatus should be able to automatically reduce the output power to safe power and even turn off a laser when a laser leakage occurs. The solution is expressed as an Automatic Power Reduction (APR) and an Automatic Power Shutdown (APSD) solution in G.664.

There is a need for line monitoring capabilities to be added to an optically amplified system in an efficient manner with minimal additional components. Specifically, Optical Time Domain Reflectometry (OTDR), for monitoring the attenuation along the length of a link, and Link Continuity Validation (LCV) is used for determining a valid closed bidirectional optical circuit between two nodes.

SUMMARY OF THE INVENTION

Systems and methods of the present invention meet the need described above and implement in a technically unpredictable, elegant, and very efficient way a solution to the unmet need that, in one embodiment, uses only a single optical source for both OTDR and LCV functions which (a) prevent fiber span link damage from high optical powers found in Raman-amplified links and (b) ensure eye safety for service personnel working on the fiber span link when a failure occurs. Systems and methods which include use of only a single optical receiver, equally technically, unpredictable, elegant, and efficient in furtherance of meeting the unmet need are also disclosed.

A monitoring system for an optically amplified link provides a single optical source for generating optical signals with which link continuity verification (LCV) testing and optical time domain reflectometer (OTDR) testing are carried out. The single optical source can be a laser diode or a Raman laser. The amplified optical signals can be directed to propagate through the link in a first direction, and the optical signals for the LCV testing and the OTDR testing can be directed to propagate through the link in a second direction that is opposite to the first direction. The amplified optical signals and the optical signals for the LCV testing can be directed to propagate through the link in a first direction, and the optical signals for the OTDR testing can be directed to propagate through the link in a second direction that is opposite to the first direction. The optical signals for the LCV testing and the OTDR testing can have a positive baseline power level and pulses superimposed on the baseline power level. The optical signals for the LCV testing and the OTDR testing can have a zero baseline power level and pulses superimposed on the baseline power level.

An optical fiber amplification node can include a light receiver optically coupled to a second optical connector for connecting to a first end of a second of a pair of optical fibers spanning between communication nodes for sensing OTDR and LCV signals according to its programming. A light source optically coupled to a first and said second connector for connection to a first end of a first and a second of a pair of optical fibers spanning between communication nodes to generate the OTDR and LCV signals to be sensing by using this node in communication with another similarly configured node at a second end of a pair of optical fibers spanning between communication nodes, wherein the light source is simultaneously connected to said first end of said first and said second of a pair of optical fibers spanning between communication nodes, thereby generate light signals to both connectors simultaneously.

A method of monitoring at least a pair of optical fibers between two nodes of an optical fiber link, comprising: launching a first node optical test pulse from a first node of said two nodes on a first fiber of said at least said pair of optical fibers between two nodes towards a second node using a first node optical light source; sensing reflection of said optical test pulse in said first fiber at said first node; sensing the receipt of said optical test pulse in said first fiber cable at said second node; launching a second optical test pulse from the second node of said two nodes on a second fiber of a pair of optical fibers between two nodes towards the first node using a second node optical light source; sensing of reflection of said optical test pulse in said second fiber at said second node; and sensing the receipt of said second optical test pulse in said second fiber cable at said first node; wherein when the receipt of said optical test pulse in said first fiber cable at said second node is not confirmed after a time greater than $T_{delay}$, initiating a line fault signal.

Another method of monitoring at least a pair of optical fibers between two nodes of an optical fiber link, comprising: launching a first node optical test pulse from a first node of said two nodes on a first fiber of a pair of optical fibers between two nodes towards a second node using a first node optical light source; initiating sensing of reflection of said optical test pulse in said first fiber at said first node; comparing the sensed reflection of said optical test pulse in said first fiber at said first node to a prescribed first reflection specification; wherein when comparison shows that the sensed reflection of said optical test pulse in said first fiber at said first node meets said prescribed specification, continuing with the process; wherein when comparison shows that the sensed reflection of said optical test pulse in said first fiber at said first node does not meet said prescribed specification, initiating a first line fault signal; waiting for a $T_{delay}$ time and then initiating sensing the receipt of said optical test pulse in said first fiber cable at said second node; wherein when the receipt of said optical test pulse in said first fiber cable at said second node is confirmed: launching a second optical test pulse from the second node of said two nodes on a second fiber of the pair of optical fibers between two nodes towards the first node using a second node optical light source; initiating sensing of reflection of said optical test pulse in said second fiber at said second node; comparing the sensed reflection of said second optical test pulse in said second fiber at said second node to a prescribed second reflection specification; wherein when comparison shows that the sensed reflection of said second optical test pulse in said second fiber at said second node meets said prescribed specification, continuing with the process; wherein when comparison shows that the sensed reflection of said second optical test pulse in said second fiber at said second node does not meet said prescribed second reflection specification, initiating a second line fault signal; waiting for a $T_{delay}$ time and then initiating sensing the receipt of said second optical test pulse in said second fiber cable at said first node; and wherein when the receipt of said optical test pulse in said first fiber cable at said second node is not confirmed after a time greater than $T_{delay}$, initiating a line fault signal; wherein said fault signal can be used to shut down the system immediately.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments and are therefore not to be considered limiting of its scope and may admit to other equally effective embodiments.

DETAILED DESCRIPTION

The principles of OTDR are well understood by persons of ordinary skill in the art and discussed below.

The applications for OTDR and LCV testing are described herein. They include system installation and startup, system diagnostics during failure, and in-situ monitoring.

Fiber-optic networks are used to support voice and data communications. In optical networks that use wavelength division multiplexing, multiple wavelengths of light are used to support multiple communications channels on a single fiber.

Raman amplified systems require a safety system to ensure that the two ends of a link are fully connected and that there are no open connectors before energizing (or raising the energy sent to) the Raman pumps to a high level. One technique for verifying that two ends of a link are fully connected is known as LCV (Link Continuity Verification). The function of the LCV is to make sure that the line is intact and the line is safe for operation. The risk in Raman amplified systems is associated with the full high-power (and energy) rating of the Raman pumps, which are so high that if they are activated when the fiber (the transmission line) may still be open somewhere, it could cause personnel eye injury. For example, escaping high energy light from an open fiber line could hit a human operator's eye causing severe eye damage, if not blindness.

For Raman amplified systems, it is also advantageous to incorporate OTDR (Optical Time Domain Reflectometer) functionality to test the fiber for possible lumped losses (non-uniform high signal attenuation regions), as these are often caused by dirty connectors that could easily burn up and darken as a result of high Raman pump powers (energies) and cause further signal attenuation. In particular, it is particularly good to perform OTDR testing of the first 20-50 km of the optical link prior to launching the Raman source to full power. While the OTDR results do not provide guidance in terms of human safety, they do help to protect equipment. A dirty connector, while providing no risk of light escaping, can when exposed to a very high level of optical power, burn out and damage the connector and take the line with the burnt out connector out of service. In this way, the OTDR analysis and results help to protect and monitor the condition of the transmission line to anticipate maintenance outages that might be scheduled to prevent "in operation" line failures and outages.

When an OTDR trace shows a large attenuation, compared to a preset specification for line integrity or validity, an "out of specification" finding would initiate an alarm, line outage and/or some sort of prospective repair scheduling or immediate repair activity.

Figure 1:
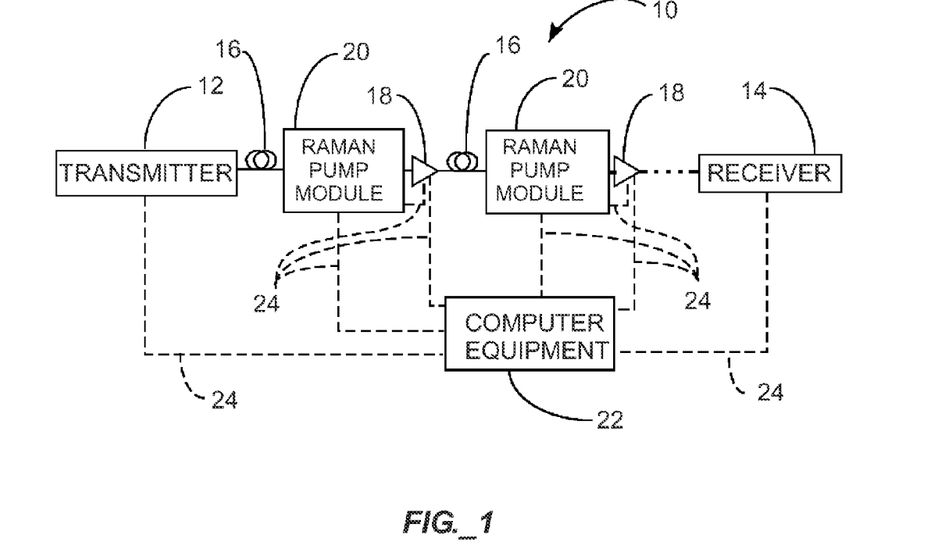
FIG. 1 is a schematic diagram of an illustrative fiber-optic communications link.

An illustrative fiber-optic communications link 10 in an optical communications network is shown in FIG. 1. A transmitter 12 transmits information to a receiver 14 over a series of fiber links. Each fiber link may include a fiber span 16 of optical transmission fiber. Fiber spans 16 may be on the order of up to 200 km in length for long-haul networks or may be any other suitable length for use in signal transmission in an optical communications network. Link 10 may be part of a fiber ring network or any other suitable network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527-1605 nm. These are merely illustrative system characteristics. If desired, fewer channels may be provided (e.g., one channel), more channels may be provided (e.g., hundreds of channels), signals may be carried on multiple wavelengths (e.g., using optical go code division multiple access (CDMA) arrangements), signals may be modulated at slower or faster data rates (e.g., at approximately 2.5 Gbps for OC-48 or at approximately 40 Gbps for OC-768), and different carrier wavelengths may be supported (e.g., wavelengths in the range of 1240-1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Raman pump modules 20 may be used to provide Raman pump light to fiber spans 16. The Raman pump light creates Raman gain in fiber spans 16 through stimulated Raman scattering. Each Raman pump module may provide pump light at one or more wavelengths using sources such as laser diode sources, fiber lasers, or other suitable sources of pump light. Although the arrangement of FIG. 1 involves the counterpumping of spans 16 with Raman pump light, if desired, spans 16 may be copumped with Raman pump light.

Computer equipment 22 may be used to implement a network management system. Computer equipment 22 may be located at network nodes and/or a network management facility. As indicated by dashed lines 24, the network management system may communicate with optical amplifiers 18, transmitter 12, receiver 14, Raman pump modules 20, and other optical network equipment using suitable communications paths. The communications paths may be based on any suitable optical or electrical paths. For example, the communications paths (for example, represented by dashed lines 24) may include service or telemetry channel paths, may include wired or wireless communications paths, and may involve communications paths formed by slowly modulating the normal data channels on link 10 at small modulation depths, etc. Communication paths (represented by dashed lines 24) may also be used for direct communications between Raman pump modules 20 and optical amplifiers 18.

Link 10 may also include optical network equipment modules such as add/drop modules, optical switches, dispersion compensation modules, dynamic filter modules, or any other suitable optical network equipment.

Figure 2:
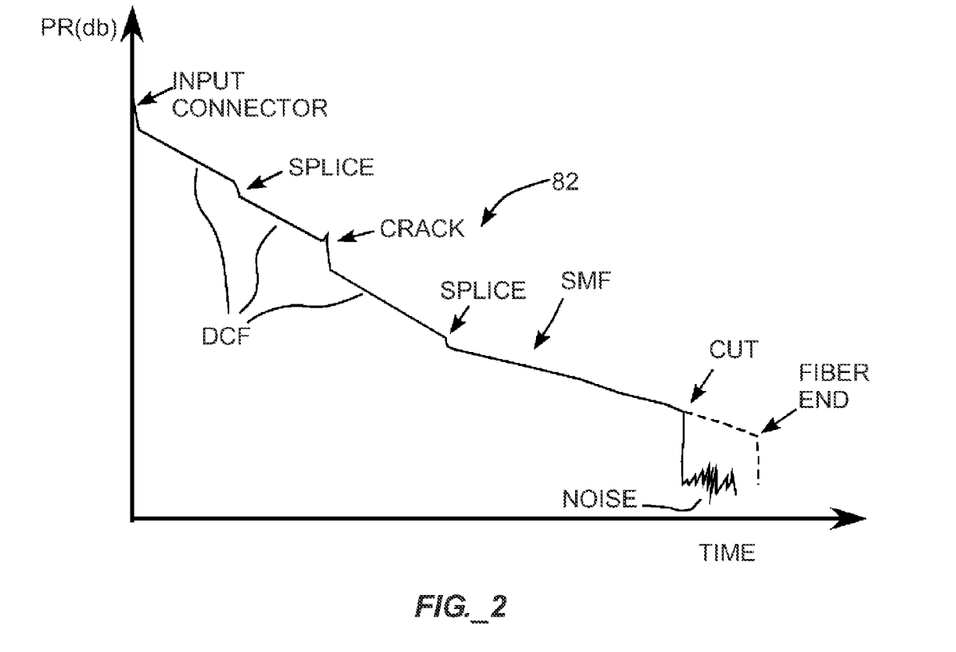
FIG. 2 is a graph of an illustrative optical time domain reflectometry trace measured using a Raman pump.

An illustrative optical time domain reflectometry trace 82 that may be acquired by a control unit and monitor associated with the computer equipment 22 using a Raman pump associated with the Raman pump module 20 is shown in FIG. 2. In the example of FIG. 2, the reflected signal power (i.e., the reflected pump power from a Raman pump associated with Raman pump module 20) has been plotted as a function of time. If desired, the time scale on the x-axis of the graph of FIG. 2 may be converted into a distance scale based on the known characteristics of fiber span 16 such as the group velocity. The y-axis (power) in FIG. 2 is plotted on a log (dB) scale.

Trace 82 shows a number of features that are present in an illustrative fiber span 16. For example, the presence and locations of splices, cracks, cuts, and connectors may be determined. When the control unit associated with the computer system 22 detects a fault, such as a crack or an improperly disconnected connector, the control unit may generate an alarm and may reduce the power of the Raman pump (e.g., to zero or another eye safe level). The total length of the fiber span 16 may also be measured when no cuts are present.

Trace data may also be used to identify the fiber in span 16. Different fiber types may be used for different sections of span 16. For example, fiber span 16 may contain standard single mode fiber (SMF) or dispersion-compensating fiber (DCF) or other fiber types. Different types of fiber may be characterized by their loss per unit length and effective core areas ($A_{EFF}$). When trace 82 is plotted on a log scale, as in FIG. 2, the slope of trace 82 in a given region is inversely related to the value of $A_{EFF}$). In the example of FIG. 72, two fiber types—SMF and DCF—were used in different portions of fiber span 16, as evidenced by the characteristic slopes. Information on the fiber type or types in fiber span 16 may be used by the control unit associated with the computer equipment 22 and the network management system in determining the appropriate pumping powers and other settings for Raman pump modules 20 and amplifiers 18.

If desired, taps and monitors may be used in the Raman pump modules 20 to measure the signal's power on fiber span 16 at various Raman pump levels. This allows the control unit to gather information on the on-off Raman gain produced by Raman pump modules 20. The results of such on-off gain measurements may be combined with the results of optical measurements made at the pump wavelengths to further characterize fiber span 16.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman pumps lasers are also sometimes incorporated in optical amplifiers to get additional optical gain by using the Raman effect in the transmission fiber linking to erbium-doped amplifiers. Raman pump signals are typically configured to propagate in the opposite direction to the data signals.

The purpose of system installation and startup is: to determine fiber line loss profile of a transmission link to allow optimization of Raman pump powers and to identify poor connectors/splices prior to powering up Raman pumps. The continuous system diagnostics failure resolution analysis function includes: locating a fiber break; in-situ monitoring; and locating and monitoring points in the transmission line undergoing slow degradation to facilitate and enable preventative maintenance to be scheduled before the degradation becomes an unexpected fiber link failure.

Figure 3:
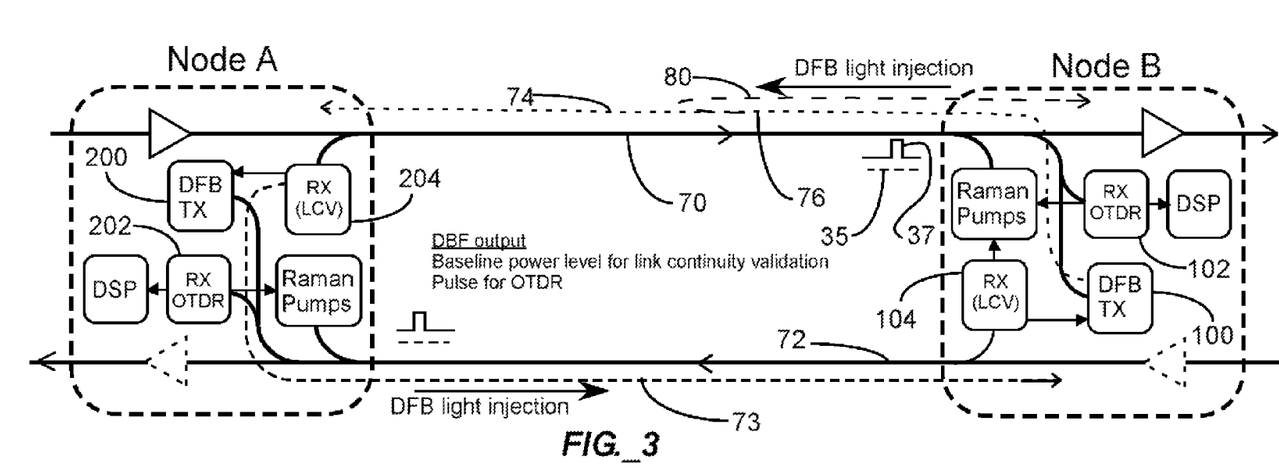
FIG. 3 is a schematic diagram illustrative of connections and signal flow to measure the characteristics of an optical fiber pair spanning between two nodes of a transmission connection using a DFB light source.
Figure 4:
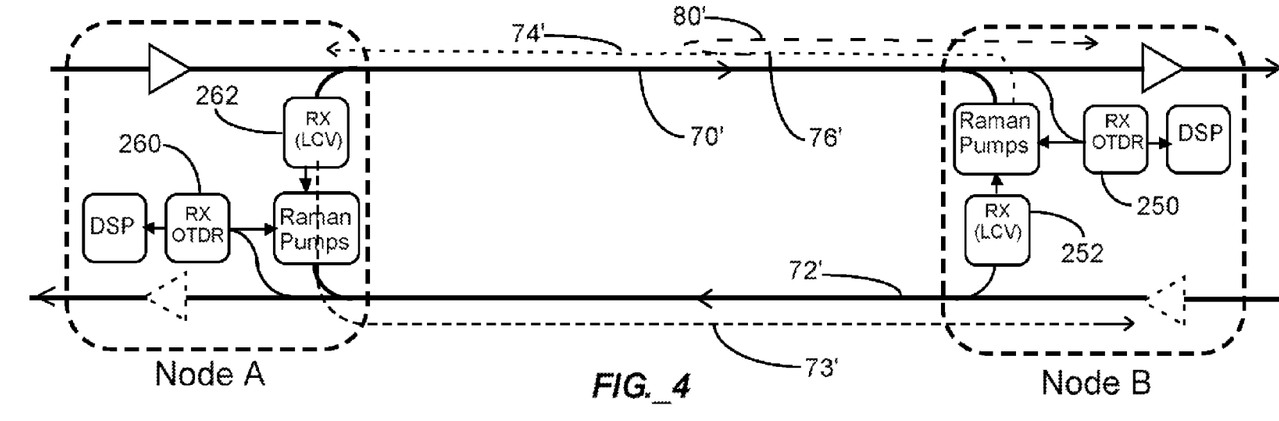
FIG. 4 is a schematic diagram illustrative of connections and signal flow to measure the characteristics of an optical fiber pair spanning between two nodes of a transmission connection using a Raman pump light source.

In one embodiment, a single optical source at each node generates test signals that are propagated in a direction opposite to data signals carried on the optical link. The configuration shown in FIGS. 3 and 4 illustrate two variations. In the one variation, a DFB (Distributed Feedback) transmitter includes a laser diode that generates test signals for OTDR and LCV testing. In a second variation, (controlled energy) Raman lasers are used as a light source that generates test signals for OTDR and LCV testing.

In FIGS. 3 and 5-7, a single optical source labeled "DFB TX" is used to generate optical signals for LCV and OTDR.

In reviewing FIG. 3, at Node B, a DFB TX 100, which is a DFB laser (transmitter), provides a pulse, e.g., 37, and a DC level, e.g., 35, (elevated level base signal-not direct current, but similar baseline signal level in an optical signal setting, the base line signal (~1 mW) represents no light) to the top fiber 70. Normally, for optical time domain reflectometry (OTDR), a test pulse is no light, a full amount of light, and no light. The test signals from DFB TX 100, 200 in Nodes A and B in FIG. 3 are used for both the OTDR and the LCV evaluations. The DFB TX (transmitter) emits a light pulse, that is used to evaluate the OTDR, that is added on top of a DC level of light, dashed line 80, represents the path of a reflected pulse that goes back to the OTDR signal receiver RX OTDR 102. The transmitting DFB TX (100, 200) emits pulses, represented by dashed line 76 and pulse 37, and parts of that (of those) light pulse is reflected back along the top fiber 70 to the receiver RX OTDR 102. Dashed line 74 represents the path of the base line signal 35 as it continues (past the reflection points of the OTDR), so a still remaining part of the test signal (at least the baseline test signal level) traverses the whole span, if the fiber is intact, and the signal is received at Node A (RX (LCV) 204). When Node A receives the tests signal from Node B along the top fiber 70, it causes DFB TX 200 to emit a pulse back to Node B along the bottom fiber 72 to be received by receiver RX(LCV) 104 to complete the cycle, to thereby inform Node B that it has received the test pulse. As the pulse (represented by dashed line 73) is sent from Node A towards Node B along the bottom fiber 72 (a back reflection pattern is not shown in the diagram for the bottom fiber 72), the receiver RX OTDR 202 can be simultaneously listening and making an OTDR evaluation of the bottom fiber 72.

Node B upon receiving the signal from Node A, thereby has confirmation that the lower optical fiber 72 leading into Node B is also safe (this process is illustrated in the time lines and process diagram of FIGS. 6 and 7, discussed further below). Between Node A and Node B, the system knows that the fiber, or the two optical fibers (span), a.k.a. a fiber pair, is intact. Once optical fibers are verified as being intact (or being optically sealed), the high power Raman pumps can be turned on (or raised to their high energy level from a low energy level).

Previously, OTDR has been done with Raman pumps without link continuity verification, e.g., U.S. Pat. No. 6,850,360 B1. One disadvantage of Raman pumps is that the wavelength of light that is used is diminished rapidly in glass. Glass used in fiber optics is designed to work at 1550 nm, whereas the Raman pumps pump at a wavelength of about 1450 nm, diminishes energy rapidly, and therefore does not travel particularly far. An OTDR analysis on the first section of the fiber optic span between nodes using a low energy Raman light source provides an indication of the condition of that first section only. A full length span validation cannot be performed using a low energy Raman light source. So DFB, which is a pretty cheap small laser, is used.

The signal process and sequence described herein provide an automated sequence of signals which are sent and received between Nodes A and B to evaluate OTDR and LCV. Previously, an operator or technician would be sent to Node B and another operator or technician to Node A, and they would phone each other and talk through the OTDR and link verification procedures.

The operating convenience and efficiency described herein provides fiber integrity verification, without an operator or a technician having to go out of a control room. A high power Raman light source can be controlled in Nodes A and B, while continuing to assure the safety of personnel in the area. Decisions are made by the controls in the individual nodes. That decision process and the automation of the communication between Node B and Node A, and between Node A and Node B, to verify an optical fiber pair span between nodes, has not previously been known.

It is feasible to use the Raman lasers (lasers generated by Raman pumps) themselves as the optical source for the OTDR and LCV as well. This is shown in FIG. 4. However, this does require the Raman pump laser drive circuitry to be designed in a way that ensures that the optical power level used for the LCV testing is kept at a safe low level, even if the drive circuit fails. It also may result in some degradation of the data signal being transmitted due to the presence of OTDR pulses and reflections in the fibers.

In FIG. 4, only Raman pump signals are used for both OTDR and LCV. There is no DFB TX. The RX OTDR 250, 260 is the receiver for the OTDR, and then there is RX LCV 252, 262, which receive the link verification signal. The lines and dashed line 70', 72', 73', 74', 76', and 80' correlate in function to the respective lines and dashes lines 70, 72, 73, 74, 76, and 80 as shown and discussed for FIG. 3.

In one embodiment, a baseline DC optical power level is used for LCV testing, and OTDR pulses (e.g., at 1 kHz with a 0.1% duty cycle) are superimposed. However, it is feasible to use the same optical pulses for both OTDR testing and the LCV signal, so no separate DC level of optical power for the LCV function is needed. This might give rise to better OTDR sensitivity, but this comes at a loss of flexibility in terms of ability to set the OTDR pulse parameters since the pulse parameters must always be sufficient to ensure correct operation of the LCV.

Figure 5:
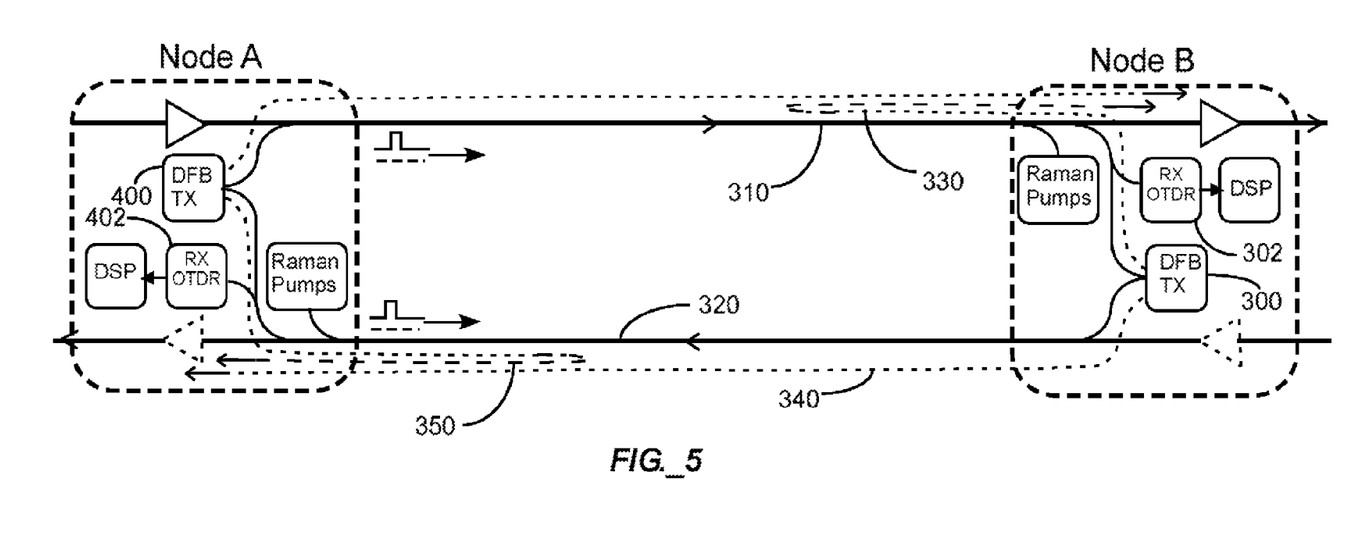
FIG. 5 is a schematic diagram illustrative of connections and signal flow to measure the characteristics of an optical fiber pair spanning between two nodes of a transmission connection using a single light source and a single light receiver monitoring test pulses.

In another embodiment, the single optical source in a node generates the OTDR test signals that are propagated in a direction opposite to data signals carried on the optical link, and LCV test signals are propagated in the same direction as data signals carried on the optical link. FIG. 5 of the drawings illustrates this embodiment, where a DFB TX, 300, 400 transmitter in each node includes a laser diode that generates OTDR test signals that are propagated in a direction opposite to data signals (shown by the direction the large solid and dashed line triangle shapes on fibers 310, 320 are pointing) and LCV test signals that are propagated in the same direction as data signals. In FIG. 5, the DFB signals are counter propagating, with respect to the data signals. On the top fiber 310 data signals go from Node A to Node B. The data in the bottom fiber 320 goes from right to left. Because a single optical source and a single receiver are used for both OTDR testing and LCV testing, the use of these devices is time multiplexed between the two testing modes.

Figure 6:
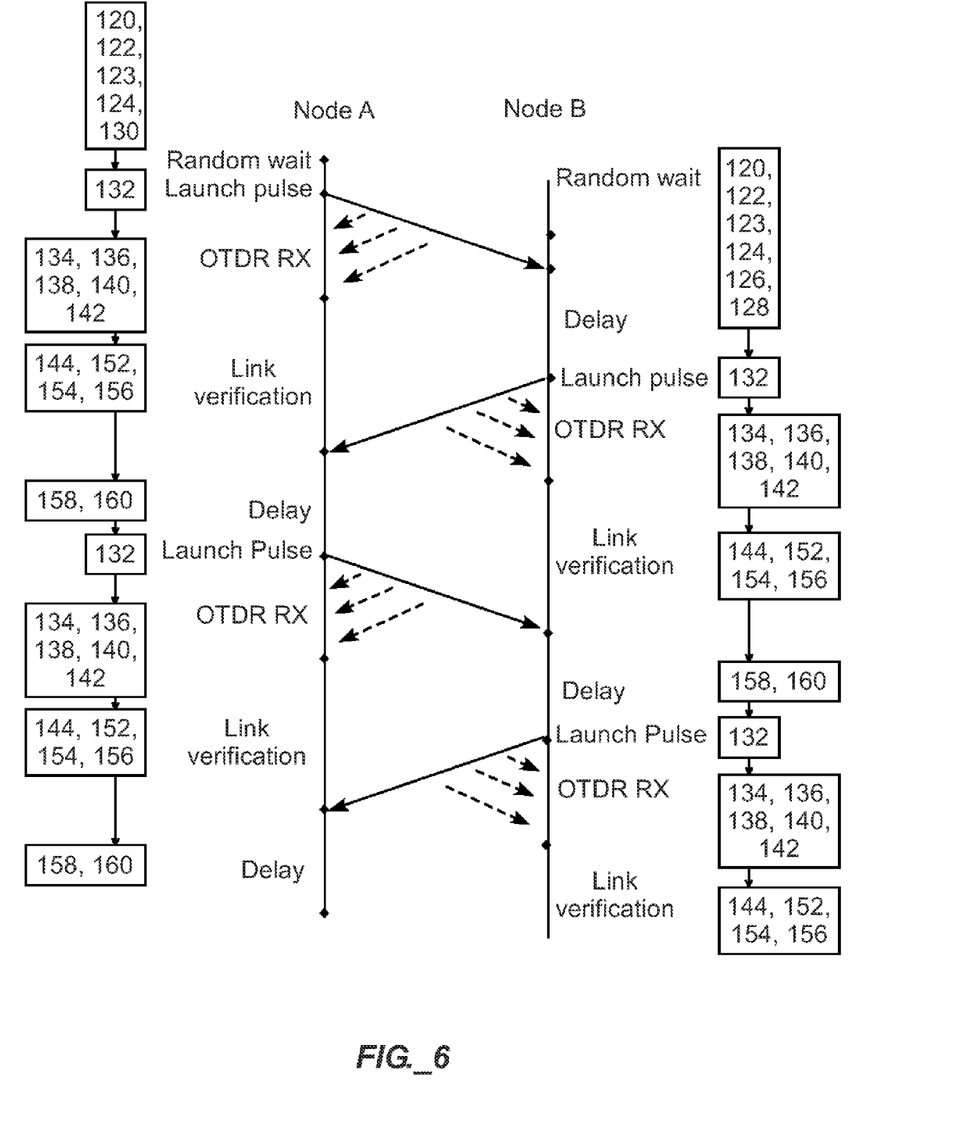
FIG. 6 is a vertical timing diagram showing the timing and initiation of pulses from Nodes A and B in a system depicted in FIG. 5.
Figure 7:
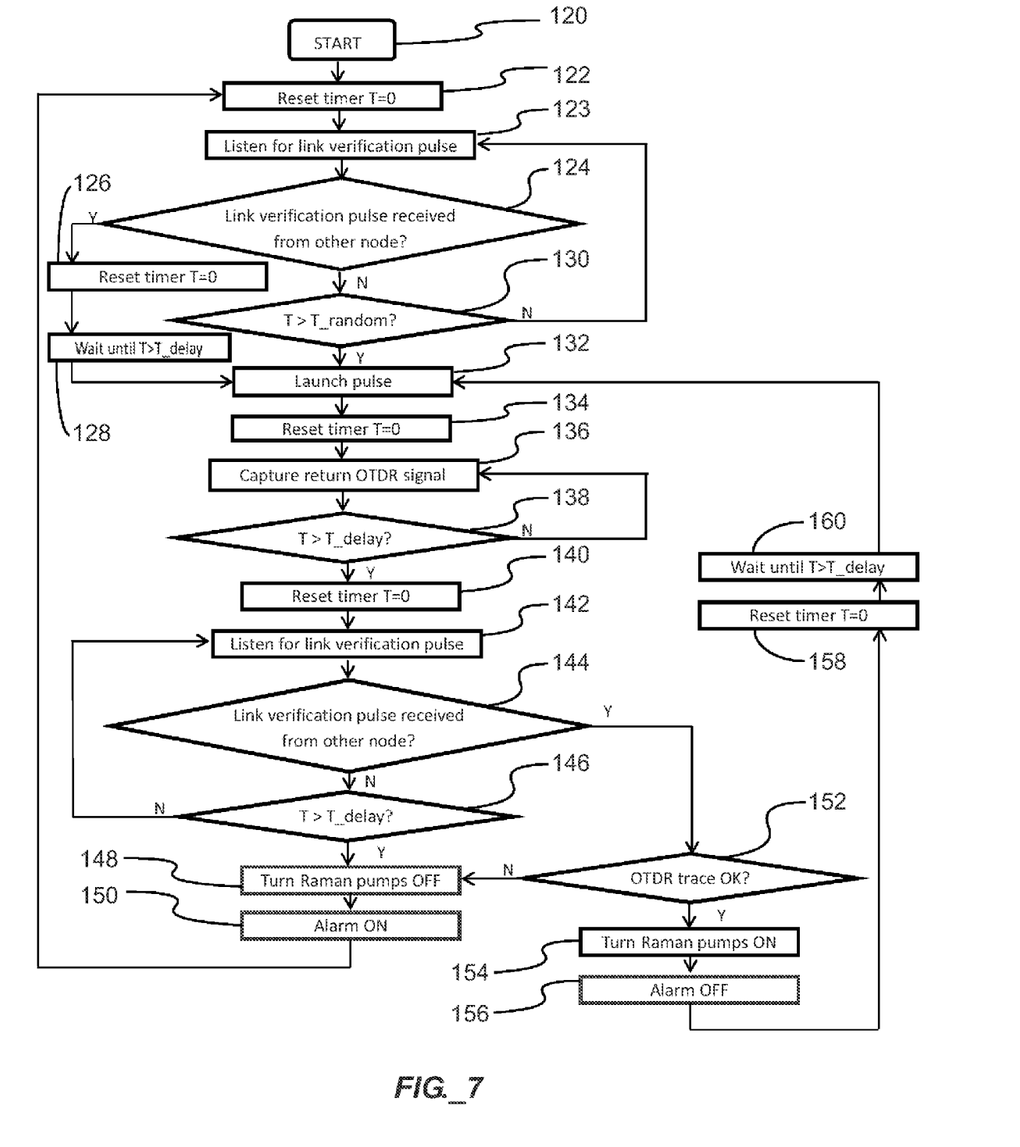
FIG. 7 is a flow chart of illustrative steps involved the timing and initiation of pulses from Nodes A and B in a system depicted in FIG. 5.

FIGS. 6-7 illustrate the protocol for switching between the OTDR testing mode and the LCV testing mode for the configuration shown in FIG. 5. The protocol features a "random wait" and "delay" which prevents adjacent nodes from starting up and initiating launching pulses at the same time and time delays during continuous operation, which separates the time when OTDR pulses are expected to be received from the time when link verification pulses are expected to be received.

The transmission optical fibers as shown in FIG. 5 include only one DFB TX (transmitter) 300, 400 and one RX OTDR (receiver) 302, 402 at a node.

At Node B, RX OTDR 302 is the receiver for the reflected and link verification DFB signals. The DFB TX 300, at Node B, is sending pulses to the left along both the top and bottom fibers 310, 320. Reflected pulses in the top fiber 310 are expected to be received by Node B. Those reflected pulses would be received at the RX OTDR 302. (Reflected pulses in the bottom fiber are not sensed at Node B.)

In Node A, a DFB TX 400 is sending laser light to Node B along both the top 310 and the bottom 320 fibers, simultaneously, to provide link continuity verification in the top fiber 310 and provide an OTDR pulse signal in the bottom fiber 320. If Node B receives (at receiver RX OTDR 302) the light from Node A, it knows that the top optic fiber 310 is not broken.

Distinguishing between arriving signals is a potential issue. Potentially there can be two sets of DFB laser signals arriving at RX OTDR 302, in Node B (the reflected signal sent from Node B and the original signal sent from Node A). It is necessary to distinguish between the two. One suggestion is to put in a pulse code in the signal of the DFB TX 400 at Node A. The form of signal sent back to RX OTDR 302 in Node B would be one that the receiver was able to lock onto (distinguish from other signals). If it is a code, the receiver 302 can understand that code, because it is expecting a particular code. If received, that tells the system that there is an intact fiber. In this arrangement, compared to the other arrangements, only one receiver, e.g., 302, 402 at each node, is used saving the complexity and expense of connecting to and programming a second receiver into the system.

The vertical timing diagram shown in FIG. 6 illustrates normal (no faults present in the fiber pair) signal movement between adjacent nodes including OTDR reflection and the steps for link verification. Two cycles are illustrated. Once initiated, under normal operating conditions, the process would continue endlessly. The steps of the process, that occur at one node are illustrated in FIG. 7, whose process step reference numbers track the signal sent and received at Node A and Node B illustrated in FIG. 6, as OTDR and LCV occur between Node A and Node B.

The process progresses from start-up as illustrated in FIG. 7: upon "start" (120), a node timer "T" is reset to zero, i.e., "reset time T=0" step (122), "listening for link verification pulse" (123) occurs, and an evaluation "link verification pulse received from other node?" (124) is made. When no pulse is received from the other node (124), then a "T>T_random?" (130) evaluation is made (T_random is set in this example to be approximately 0.1 to 1.0 sec.). When the answer to "T>T_random?" (130) is "no", the process returns to the "listen for verification pulse" step (123). When the answer to "T>T_random?" (130) is "yes", a "launch pulse" step (132) takes place. Alternately, when the answer to the "link verification pulse received from other node?" (124) is yes, a "reset timer T=0" step (126), progresses into a "wait until T>T_delay" step (128), to cause the "launch pulse" step (132) to take place.

A correlation of the process steps of FIG. 7 will be made to the timing diagram of FIG. 6. However, the assumption in following the movement of light signals between Nodes A and B is that the process steps are progressing "normally" along the identified process steps and that no faults or evaluation steps will cause the process to depart to or stop on a branch process path. When the nodes are activated (started) in FIG. 6, both Nodes A and B begin with a "Random wait" event. The "Random wait" event in FIG. 6 includes the process steps (matching those same numbered process steps as described above for FIG. 7) as identified in the rectangular box next to the words "Random wait", i.e., 120, 122, 123, 124, 130. Upon completion of the "Random wait" event, the "Launch pulse" event, i.e., 132, takes place to launch a light pulse from Node A towards Node B. In this instance as seen in FIG. 5, the pulse is launched along both the top fiber 310 and the bottom fiber 320.

Returning to FIG. 7, after the "launch pulse" step (132), a "reset timer T=0" step (134), "capture return OTDR signal" step (136), a "T>T_delay?" evaluation (138), a "reset timer T=0" step (140), and "listen for link verification pulse" step (142) take place.

In FIG. 6, the OTDR RX event at Node A, is shown by the dashed arrows downward to the left appearing to emanate from the solid line representing the light signal being sent from Node A to Node B. The rectangular box enclosing the reference numbers correlate to the process steps in FIG. 7, i.e., 134, 136, 138, 140, 142.

In FIG. 5, returning dashed line 350 represents the OTDR reflection returning to Node A, in the bottom fiber 320.

In FIG. 6, at Node B, the "Random wait" and "Delay" events progress through process steps as referenced in FIG. 7, the reference numbers located within the rectangular box adjacent to the event name, i.e., 120, 122, 123, 124, 126, 128. In the Instance of Node B, since it has received a pulse from Node A, it resets its timer to zero and then waits a T_delay time before initiating its "Launch pulse" event, represented by and correlating to the process step reference 132, as previously described for FIG. 7. Upon "Launch pulse" (132) from Node B, the OTDR RX event at Node B, is shown by the dashed arrows downwards to the right, appearing to emanate from the solid line representing the light signal being sent from Node B to Node A. The rectangular box enclosing the reference numbers correlate to the process steps in FIG. 7, i.e., 134, 136, 138, 140, 142.

In FIG. 5, returning dashed line 330 represents the OTDR reflection returning to Node B in the top fiber 310.

Returning to FIG. 7, after the "listen for link verification pulse" step (142), a "link verification pulse received from other node?" evaluation (144) takes place. A "yes" answer to the "link verification pulse received from other node?" evaluation (144) causes the process to move to a "OTDR trace okay?" evaluation (152), to which a "yes" answer leads to "Turn Raman pumps ON" step (154), and "Alarm OFF" step (156).

The above-described steps correlate in FIG. 6 to the "Link verification" activity/event at Node A, correlating to process step numbers from FIG. 7 in the adjacent rectangular box, i.e., 144, 152, 154, 156.

In FIG. 7, alternately, if a "no" answer is returned from the "Link verification pulse received from other node?" evaluation (144), then a "T>T_delay?" evaluation (146) is made. If a "no" answer results from "T>T_delay" (146), then the "Listen for link verification pulse" step (142) is repeated. If a "yes" answer results from "T>T_delay" (146), then a "Turn Raman pumps OFF" step (148) and an "Alarm ON" step (150) take place. Once the "Alarm ON" step (150) takes place, the process may be aborted or may return to a restart evaluation at the "Reset timer T=0" step (122).

In FIG. 7, another alternative process path provides that if a "no" answer is returned in response to the "OTDR trace OK?" evaluation (152), then the process moves to the "Turn Raman pumps OFF" step (148) and on from there.

Moving forward the process steps, as shown in FIG. 7, from the "Alarm OFF" step (156), the "Reset timer T=0" step (158) and "Wait until T>T_delay" step (160), provide a delay equal to "T_delay" before the "Launch pulse" step (132) is reached.

In FIG. 6, at node A the next event is a "Delay" event, which operation correlates to the process step numbers referenced, with respect to FIG. 7, in the associated rectangular box, i.e., 158, 160, before moving to the next action (process step), the "Launch Pulse" event of Node A, as referenced by the number associated with the process step shown in FIG. 7, in the associated rectangular box, i.e., 132, and then on to the "OTDR RX" event/activity at Node A, i.e., 134, 136, 130, 140, 142, and onto the "Link verification" activity, i.e., 144, 152, 154, 156.

The process steps of FIG. 7, having been fully described, are now referenced with respect to the remaining timing of pulse movements illustrated in FIG. 6. After the "Launch Pulse" event at Node A, the "OTDR RX" activity takes place at Node A, i.e., 134, 136, 138, 140, 142. At Node B a "Delay" event, i.e., 158, 160, and "Launch Pulse" event, i.e., 132 take place to launch a pulse from Node B towards Node A and begin the "OTDR RX" activity/event at Node B, i.e., 134, 136, 138, 140, 142, and on to the "Link verification" activity, i.e., 144, 152, 154, 156. The last activities shown In FIG. 64 Node A, are the "Delay" activities/events, i.e., 158, 160.

The described process steps evaluate the received signals, and if they fall below a certain threshold value or standard, a fault condition is initiated prompting an alarm to go off and initiate a shutdown of the Raman light source.

The flowchart of FIG. 7, only applies to the embodiment shown in FIG. 5. FIG. 5 shows the use of one receiver for both the link verification and the OTDR function. In this configuration, the receiver has to know when it should be in OTDR mode and when it should be in link verification mode. The embodiments shown in FIGS. 3 and 4 have physically separate receivers for the LCV and the OTDR functions, so the possibility of signal confusion is not a consideration.

Ordinarily, when the process is working normally, Node A is sending a pulse, and once Node B receives it, and after a certain fixed delay, it sends a pulse back to Node A. This one pulse is essentially going back and forth between Node A and Node B. The issue of how to manage the startup between Node A and Node B (system is set up so that there should only ever be one pulse going back and forth between the two nodes) must be addressed. The risk is that when these two nodes are first powered up, they both start sending pulses at the same time, then the system could run into a state of confusion where the two nodes would not be sure if the pulses being received are acknowledgment pulses or OTDR pulses. To avoid such confusion, a common method used is to start up and wait some random length of time. If a pulse is received during that wait time, it is obvious that that pulse did not originate from this node and must have come from the node at the other end of the fiber, which has already started up and sent a pulse to this node, in which case the normal process from the point of having received an external pulse progresses within the present node. That is what the "random wait" state process achieves. If an external pulse is received, then the random wait process is stopped, and the normal launch pulse process progresses.

Once OTDR is embedded in a normal operating fiber span scheme, the system control gives a system operator the capability to be remotely connected to a network and remotely log in to that equipment anywhere in the network to observe what the OTDR is reporting along with the LCV described herein.

As described herein, the OTDR and LCV link continuity verification are performed with a minimal amount of hardware. In this case, the OTDR and LCV functions are carried out using a single optical source, at each node. The use of a single optical source reduces power consumption by not requiring power that may be used to drive other optical sources. As a result, such reduced power consumption requirements improve the system's environmental friendliness. Reduced system and control element complexity and improved reliability are achieved by using a single optical source and similarly a single optical signal receiver for the OTDR and LCV evaluations described.

While the foregoing is directed to embodiments according to the present invention, other and further embodiments may be devised without departing from the basic scope thereof, and the scope thereof is determined by the claims that follow.

The invention claimed is:

1. A monitoring system for an optically amplified link, comprising:
   a first optical fiber amplification node comprising:
      a single optical source for generating optical signals, with which link continuity verification (LCV) testing and optical time domain reflectometer (OTDR) testing are carried out, wherein the single optical source is coupled to a first fiber and the first fiber is also coupled to a second optical fiber amplification node;
      a light receiver coupled to a second fiber, wherein the second fiber is also coupled to the second optical fiber amplification node, and is configured to detect optical signals sent from the second optical fiber amplification node;
      a Raman laser used to generate Raman gain in a fiber selected from a group consisting of: the first fiber, and the second fiber; and
   a controller configured to:
      cause the single optical source to generate a first optical signal that is sent to the second optical fiber amplification node via the first fiber;
      perform OTDR testing based on receipt of reflections of the first optical signal via the first fibre at the first optical fibre node;

perform LCV testing based-in part on a receipt of a second optical signal, by the light receiver, via the second optical fiber, wherein the second optical signal is sent to the first optical fiber amplification node after the second optical fiber amplification node receives the first optical signal, and adjust a power level of the Raman laser based in part on the performed LCV testing.

2. The system of claim 1, wherein the single optical source is a laser diode.

3. The system of claim 1, wherein the single optical source is a Raman laser.

4. The system of claim 1, wherein amplified optical signals are directed to propagate through the link in a first direction, and the optical signals for the LCV testing and the OTDR testing are directed to propagate through the link in a second direction that is opposite to the first direction.

5. The system of claim 1, wherein amplified optical signals and the optical signals for the LCV testing are directed to propagate through the link in a first direction, and the optical signals for the OTDR testing are directed to propagate through the link in a second direction that is opposite to the first direction.

6. The system of claim 1, wherein the optical signals for the LCV testing and the OTDR testing have a positive baseline power Level and pulses superimposed on a baseline power level.

7. The system of claim 1, wherein the optical signals for the LCV testing and the OTDR testing have zero baseline power level and pulses superimposed on the baseline power level.

8. The optical amplification node of claim, wherein the single optical source is simultaneously connected to the first fiber and the second fiber said first end of said first and said second of a pair of optical fibers spanning between communication nodes, to thereby generate light signals to the second optical fiber amplification node on both the first fiber and the second fiber both connectors simultaneously.

9. A method of monitoring at least a pair of optical fibers between two nodes of an optical fiber link, comprising:

launching a first node optical test pulse from a first node of said two nodes on a first fiber of said at least said pair of optical fibers between two nodes towards a second node using a first node optical light source;

sensing reflection of said first optical test pulse in said first fiber at said first node;

sensing the receipt of said first optical test pulse in said first fiber at said second node;

responsive to sensing the receipt of said first optical test pulse, launching a second optical test pulse from the second node of said two nodes on a second fiber of said at least said pair of optical fibers between two nodes towards the first node using a second node optical light source;

sensing of reflection of said second optical test pulse in said second fiber at said second node; and sensing the receipt of said second optical test pulse in said second fiber at said first node;

wherein when the receipt of said first optical test pulse in said first fiber at said second node is not confirmed after a time greater than predefined fixed system time parameter $T_{delay}$, initiating a line fault signal.

10. A method of monitoring at least a pair of optical fibers between two nodes of an optical fiber link, comprising:

launching a first node optical test pulse from a first node of said two nodes on a first fiber of said at least said pair of optical fibers between two nodes towards a second node using a first node optical light source;

initiating sensing of reflection of said first node optical test pulse in said first fiber at said first node;

comparing the sensed reflection of said first node optical test pulse in said first fiber at said first node to a prescribed first reflection specification;

wherein when comparison shows that the sensed reflection of said first node optical test pulse in said first fiber at said first node meets said prescribed specification, continue with the method;

wherein when comparison shows that the sensed reflection of said first node optical test pulse in said first fiber at said first node does not meet said prescribed specification, initiate a first line fault signal;

waiting for a $T_{delay}$ time and then initiating sensing the receipt of said first node optical test pulse in said first fiber at said second node;

wherein when the receipt of said first node optical test pulse in said first fiber at said second node is confirmed:

launching a second optical test pulse from the second node of said two nodes on a second fiber of said at least said pair of optical fibers between two nodes towards the first node using a second node optical light source;

initiating sensing of reflection of said second node optical test pulse in said second fiber at said second node;

comparing the sensed reflection of said second node optical test pulse in said second fiber at said second node to a prescribed second reflection specification;

wherein when comparison shows that the sensed reflection of said second node optical test pulse in said second fiber at said second node meets said prescribed specification, continue with the method;

wherein when comparison shows that the sensed reflection of said second node optical test pulse in said second fiber at said second node does not meet said prescribed second reflection specification, initiate a second line fault signal;

waiting for a $T_{delay}$ time and then initiating sensing the receipt of said second optical test pulse in said second fiber at said first node; and wherein when the receipt of said first node optical test pulse in said first fiber at said second node is not confirmed after a time greater than $T_{delay}$, initiating a line fault signal.

11. The method as in claim 10, wherein said fault signal can be used to shut down the system immediately.

* * * * *

UNITED STATES PATENT AND TRADEMARK OFFICE
CERTIFICATE OF CORRECTION

PATENT NO.        : 8,792,091 B2
APPLICATION NO.   : 13/584531
DATED             : July 29, 2014
INVENTOR(S)       : Ian McClean et al.

Page 1 of 1

It is certified that error appears in the above-identified patent and that said Letters Patent is hereby corrected as shown below:

In the Claims

Column 12, Lines 66-67, Claim 1, "...the first optical signal via the first fibre at the first optical fibre node;" should read --...the first optical signal via the first fiber at the first optical fiber node;--

Column 13, Lines 31-37, Claim 8, "The optical amplification node of claim, wherein the single optical source is simultaneously connected to the first fiber and the second fiber said first end of said first and said second of a pair of optical fibers spanning between communication nodes, to thereby generate light signals to the second optical fiber amplification node on both the first fiber and the second fiber both connectors simultaneously" should read --The optical amplification node of claim 1, wherein the single optical source is simultaneously connected to the first fiber and the second fiber, to thereby generate light signals to the second optical fiber amplification node on both the first fiber and the second fiber.--

Signed and Sealed this
Twenty-first Day of July, 2015

Michelle K. Lee
*Director of the United States Patent and Trademark Office*